United States Patent [19]
Choi et al.

[11] Patent Number: 5,598,304
[45] Date of Patent: Jan. 28, 1997

[54] FUZZY CONTROLLER FOR AN ACTUATOR AND THE CONTROLLING METHOD THEREOF

[75] Inventors: Hyun-Taek Choi; Il hong Suh; Woo Sok Chang, all of Seoul; Janghee Lee, Incheon; Goonjin Kim, Seoul, all of Rep. of Korea

[73] Assignee: Daewoo Electronics Co., Ltd., Seoul, Rep. of Korea

[21] Appl. No.: 382,902

[22] Filed: Feb. 2, 1995

Related U.S. Application Data

[63] Continuation-in-part of Ser. No. 149,833, Nov. 10, 1993, abandoned.

[30] Foreign Application Priority Data

Nov. 16, 1992 [KR] Rep. of Korea ............... 92-21516

[51] Int. Cl.$^6$ ............................................. G11B 5/596
[52] U.S. Cl. ........................... 360/78.04; 360/77.04; 360/78.06; 360/78.07; 395/3; 395/900; 364/174; 318/561
[58] Field of Search ............... 395/3, 900; 360/78.06, 360/78.07, 78.04, 78.09, 77.04, 69, 75; 364/174, 148; 318/561

[56] References Cited

U.S. PATENT DOCUMENTS

| 4,700,243 | 10/1987 | Tsuyuguchi | 360/75 |
|---|---|---|---|
| 4,717,971 | 1/1988 | Sawyer | 360/69 |
| 4,979,055 | 12/1990 | Squires et al. | 360/69 |
| 5,214,576 | 5/1993 | Tani | 395/900 |
| 5,245,698 | 9/1993 | Matsunaga | 395/900 |
| 5,251,124 | 10/1993 | Matsunaga | 395/900 |
| 5,267,144 | 11/1993 | Yoshida | 395/900 |
| 5,272,621 | 12/1993 | Aoki | 395/900 |
| 5,424,886 | 6/1995 | Tomitaka | 360/70 |

FOREIGN PATENT DOCUMENTS

| 0378331 | 7/1990 | European Pat. Off. . |
|---|---|---|
| 0426447 | 5/1991 | European Pat. Off. . |
| 0461915 | 12/1991 | European Pat. Off. . |
| 0481492 | 4/1992 | European Pat. Off. . |
| 0565155 | 10/1993 | European Pat. Off. . |
| 4015682 | 11/1990 | Germany . |
| 2079274 | 3/1990 | Japan . |

OTHER PUBLICATIONS

Yen et al.; "Servo Controller Design for an Optical Disk Drive Using Fuzzy Control Algorithm"; IEEE International Conference; Mar. 12, 1992, pp. 989997.

Hsu et al.; "Fuzzy Controller for Head–Positioning of Disk Drives"; SPIE, Electro-Optic Computer Peripherals Technology; vol. 1816; 1992; pp. 43–49.

Primary Examiner—Aristotelis Psitos
Assistant Examiner—Alan Faber
Attorney, Agent, or Firm—Nixon & Vanderhye P.C.

[57] ABSTRACT

A fuzzy controller controls a track seeking operation and a track following operation for an actuator in accordance with a position error between a present position value and a reference value. When the actuator is in track seeking operation, the actuator is accelerated or decelerated based on a velocity error value between an actual velocity value of the actuator and a target velocity value determined from a velocity profile according to the position error. In a deceleration control of the actuator, a fuzzy inference value generated based on the velocity error value and its differentiated velocity error value is used for a control of the actuator, thereby reducing an occurrence of overshooting at a target track.

10 Claims, 8 Drawing Sheets

FIG.6

| | | ACCELERATION | | | | | | (+) |
|---|---|---|---|---|---|---|---|---|
| | NB | | | | | | | PB |
| PB | PB | PB | PM | PM | PS | PS | PS | PZ |
| | PM | PM | PS | PS | PZ | PZ | PZ | Z |
| | PM | PS | PS | PZ | PZ | PZ | Z | NZ |
| | PM | PS | PZ | PZ | Z | NZ | NZ | NM |
| | PZ | Z | NZ | NZ | NZ | NS | NS | NM |
| | Z | NZ | NZ | NZ | NS | NS | NM | NM |
| | MZ | NS | MS | NM | NM | NM | NM | NB |
| NB | | VELOCITY | | | | | | |

(+)     VELOCITY     (−)

FUZZY CONTROLLER FOR AN ACTUATOR AND THE CONTROLLING METHOD THEREOF

This is a continuation-in-part of application Ser. No. 08/149,833, filed Nov. 10, 1993, which is now abandoned.

BACKGROUND OF THE INVENTION

1. Field of the Invention

The present invention relates to an information recording/reproducing apparatus, and more particularly to a fuzzy controller for an actuator and the controlling method thereof in an information recording/reproducing apparatus.

2. Description of the Prior Art

Recently, the information recording/reproducing apparatus, which records and reproduces information on and from a mass information storage media, is gradually being enhanced in its precision and functions with advanced design techniques.

The information recording/reproducing apparatus forms tracks on the information storage media to record information thereon or to reproduce information therefrom. The information recording/reproducing apparatus moves an actuator to a target track on which information is to be recorded or from which information is to be reproduced (track seeking operation). Further, when the actuator reaches the target track, the information recording/reproducing apparatus controls the actuator to follow the target track exactly (track following operation).

Moreover, techniques employing a fuzzy inference unit have been disclosed for controlled the track seeking and track following operations.

FIG. 1 is a block diagram for showing a conventional fuzzy controller using a fuzzy inference unit in a feedback system. The conventional fuzzy controller of FIG. 1 is disclosed in U.S. Pat. No. 5,251,124 granted to Nobutomo Matsunaga. As shown in FIG. 1, a first error generator 10 generates a first error value e based on a difference between a present feedback value Y from an actuator 8 and a desired value r from a reference data generator 9. First error value e is applied to a desired value correction unit 11. Desired value correction unit 11 generates a corrected desired value r, which is inputted to a second error generator 12, by applying predetermined correction constants $K_p$ and $K_i$ to first error value e in accordance with the following formula:

$$r = r + K_p * e + K_i \int e \, dt, \text{ wherein } e = r - Y.$$

Second error generator 12 generates a second error value em based on a difference between present feedback Y and corrected desired value r. Second error value em is applied to a differentiator circuit 13 and a fuzzy inference unit 14. Fuzzy inference unit 14 generates a control signal S based on fuzzy rules and membership function in accordance with second error value em and differentiated second error value Δem from differentiator circuit 13.

As can be seen in the above formula, whenever an error e (=r−Y) remains, the value of $K_i \int e \, dt$ will be increased and thus corrected desired value r will also be increased to become larger than desired value r. Accordingly, second error value em from second error generator 12 becomes larger than first error value e. Inputs of these two larger values em and Δem to fuzzy inference unit 14 for fuzzy inference enable the fuzzy controller to output a larger value for control signal S. Therefore, actuator 8 can be controlled since control signal S has a larger value even though the fuzzy controller generates a small error value in its steady-state track following operation.

However, the fuzzy controller has a drawback in that overshooting at a target track can be easily generated in a track seeking operation since a larger corrected desired value than a desired value is used for controlling the actuator.

FIG. 2 is a block diagram for showing another conventional fuzzy controller using a fuzzy inference calculation circuit in a feedback system. The conventional fuzzy controller of FIG. 2 is disclosed in U.S. Pat. No. 5,267,144 granted to Shuich Yoshida et al. As shown in FIG. 2, an actuator 227 is moved by a driving unit 230 when an access command signal P is applied to a fuzzy controller 221. A position of actuator 227, which generates a position signal X, is detected by a position encoder 228 and a position detection circuit 229. Position signal X is inputted to a velocity detection circuit 210 from which a velocity signal V of actuator 227 is generated. Fuzzy controller 221 has a fuzzy inference unit 222, a microcomputer 223, a memory 224, an interface circuit 225 and a driving signal generator circuit 220. Driving signal generator circuit 220 corrects the data of access command signal P based on a correction value obtained by fuzzy inference unit 222, and outputs a driving signal U including corrected data of an acceleration, an acceleration time, a deceleration and a deceleration time of actuator 227 to a driving circuit 226. Accordingly, a driving output current I, which is generated from driving circuit 226 when driving signal is inputted thereto, is applied to actuator 227.

FIG. 3 is a graph for showing the unevenness of a force for moving an actuator in accordance with positions of the actuator in a conventional feedback system. As shown in FIG. 3, a force is applied to actuator 227 uniformly when actuator 227 lies in a range between a position $X_{u1}$ and a position $X_{u2}$ on a disc, but not uniformly applied to actuator 227 when actuator 227 is beyond the range. Fuzzy controller 221 moves actuator 227 by distance $X_d$ to obtain an acceleration time T in the range of even force, $X_{u1} < X_e < X_{u2}$. Acceleration time T is stored in memory 224 and referred to when necessary. When a starting position $X_s$ of actuator 227 is in the range of even force, $X_{u1} < X_e < X_{u2}$, actuator 227 is accelerated during the acceleration time T for a target track. After the time T, actuator is decelerated and stops at a certain position. When starting position $X_s$ of actuator 227 is in the ranges of uneven force, $X_s < X_{u1}$ or $X_s > X_{u2}$, acceleration time T can not be used for accelerating actuator 227 for the target track and making a velocity of actuator 227 zero at the target track. Therefore, a correction time ΔT for correcting acceleration time T is calculated by a fuzzy inference in accordance with the following formula to obtain a corrected acceleration time T1:

$$T1 = T + \Delta T$$

That is, fuzzy controller 221 controls a track seeking operation of actuator 227 by correcting acceleration time T according to staring position $X_s$. However, a correction of acceleration time for an actuator disables an actuator to reach a target track without overshooting at the target track.

SUMMARY OF THE INVENTION

It is an object of the present invention to provide a fuzzy controller for controlling an actuator through a fuzzy inference in a track seeking operation.

It is another object of the present invention to provide a method for controlling an actuator through a fuzzy inference in a track seeking operation.

In order to achieve the above object, a fuzzy controller according to the present invention comprises a first error generation unit for outputting a position error value with inputs of reference value for controlling said actuator and a present position value of said actuator;

a first switching means for switching a track following operation to a track seeking operation or vice versa to control said actuator according to a result of a comparison of said position error value and a first predetermined value;

a first control signal generation unit for generating a track following operation control signal for said track following operation of said actuator based on said position error value inputted according to a switching operation of said first switching unit;

a velocity error generation unit for generating a velocity error value by calculating a difference between a target velocity value and an actual velocity value, said target velocity value being determined based on said position error value inputted according to said switching operation of said first switching unit and said actual velocity value being calculated through an arithmetic operation;

a second switching unit for switching an acceleration control to a deceleration control or vice versa for said actuator by comparing said velocity error value with a result of an arithmetic operation between a second predetermined value and said actual velocity value;

a second control signal generation unit for generating an acceleration control signal for accelerating said actuator by adding said velocity error value inputted according to a switching operation of said second switching unit and a track position error integration value obtained from an integration of track position error values that occurred at every sampling, said track position error values being indicative of values occurring when said actuator is in off-track from the center of a track; and a third control signal generation unit for generating a deceleration control signal for decelerating said actuator by performing an arithmetic operation between a fuzzy inference value generated according to fuzzy rules based on said velocity error value inputted according to a switching operation of said second switching unit and a differentiated velocity error value, said track position error integration value, a third predetermined value and said actual velocity value, a first error generation unit for outputting a position error with inputs of reference value for controlling said actuator and a present position value of said actuator.

Further, in order to achieve another object, a method for controlling an actuator comprises the steps of:

generating a position error value with inputs of reference value for controlling said actuator and a present position value of said actuator;

switching a track following operation to a track seeking operation or vice versa to control said actuator according to a result of a comparison of said position error value and a first predetermined value;

generating a track following operation control signal for said track following operation of said actuator based on said position error value inputted according to a switching operation of said operation switching step;

generating a velocity error value by calculating a difference between a target velocity value and an actual velocity value, said target velocity value being determined based on said position error value inputted according to said switching operation of said operation switching step and said actual velocity value being calculated through an arithmetic operation;

switching an acceleration control to a deceleration control or vice versa for said actuator by comparing said velocity error value with a result of an arithmetic operation between a second predetermined value and said actual velocity value;

generating an acceleration control signal for accelerating said actuator by adding said velocity error value inputted according to a switching operation of said control switching step and a track position error integration value obtained from an integration of track position error values occurred at every sampling, said track position error values being indicative of values occurring when said actuator is in off-track from the center of a track; and generating a deceleration control signal for deceleration said actuator by performing an arithmetic operation between a fuzzy inference value generated according to fuzzy rules based on said velocity error value inputted according to a switching operation of said control switching step and a differentiated velocity error value, said track position error integration value, a third predetermined value and said actual velocity value.

The fuzzy controller and method for controlling an actuator reduce an occurrence of overshooting at a target track while lessening a rising time to the target track.

BRIEF DESCRIPTION OF THE DRAWINGS

The above objects and other advantages of the present invention will become more apparent by describing in detail a preferred embodiment thereof with reference to the attached drawings in which:

FIG. 6 is a fuzzy rule table in a fuzzy inference unit of FIG. 4 for generating a fuzzy inference value according to inputs thereto.

DETAILED DESCRIPTION OF THE INVENTION

Description will be made in detail hereinafter on a fuzzy controller and method for controlling an actuator according to an embodiment of the present invention in reference with accompanying drawings.

Figure 1:
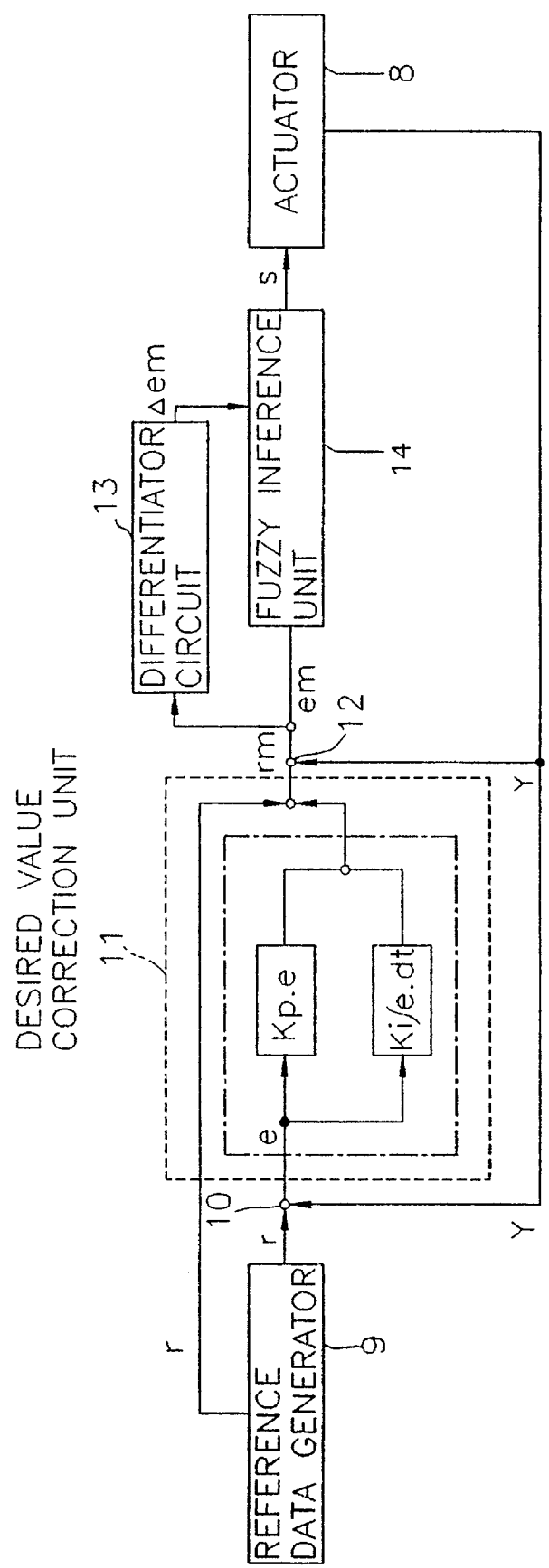
FIG. 1 is a block diagram for showing a conventional fuzzy controller using a fuzzy inference unit in a feedback system.
Figure 2:
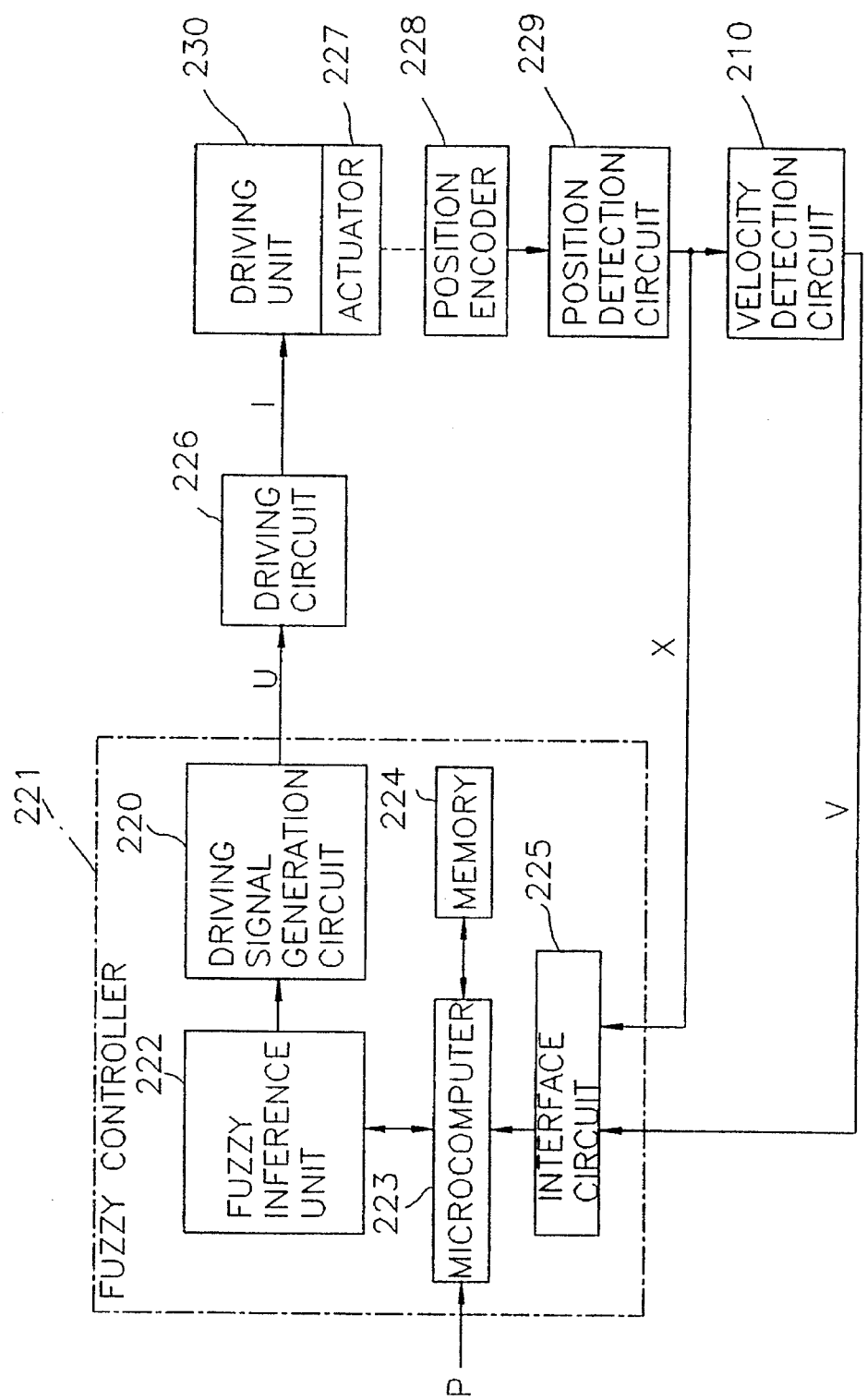
FIG. 2 is a block diagram for showing another conventional fuzzy controller in use of a fuzzy inference calculation circuit in a feedback system.
Figure 3:
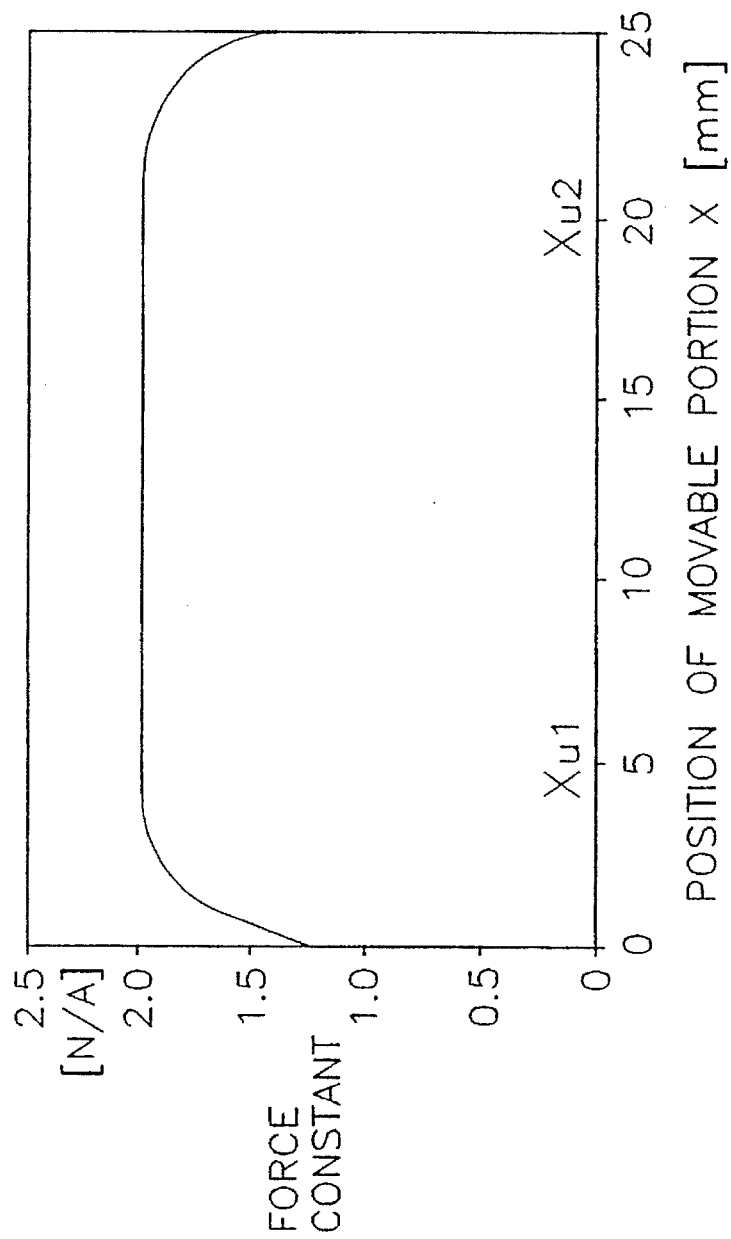
FIG. 3 is a graph for showing the non-uniformity of a force for moving an actuator in accordance with positions of the actuator in a conventional feedback system.
Figure 4:
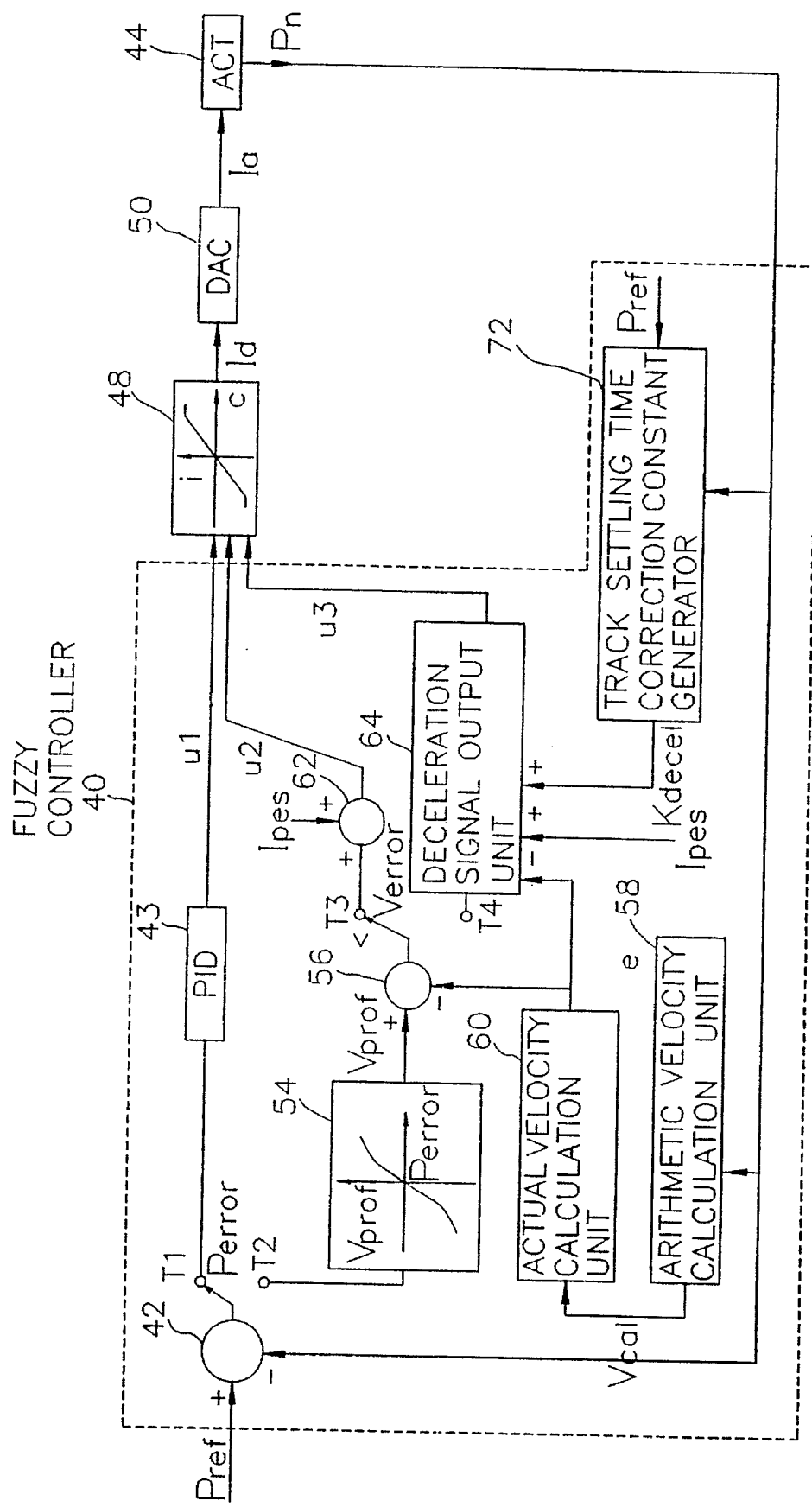
FIG. 4 is a block diagram for showing a fuzzy controller for an actuator according to an embodiment of the present invention.

FIG. 4 is a block diagram for showing a fuzzy controller for an actuator according to an embodiment of the present invention. As shown in FIG. 4, a reference value $P_{ref}$ is applied to a fuzzy controller 40. Reference value $P_{ref}$ is a value, for example, a desired track position value, which is generated from an external input unit such as a computer. Reference value $P_{ref}$ is supplied to a first error generator 42 of fuzzy controller 40 together with a present position value $P_n$. First error generator 42 generates a position error value $P_{error}$ which is a difference between present position value $P_n$ and reference value $P_{ref}$. Further, first error generator 42 compares position error value $P_{error}$ with a constant, $K_{following}$. $K_{following}$ is a value, smaller than one track moving value, which is experimentally predetermined and stored in a memory (not shown) in advance.

First error generator 42 generates position error value $P_{error}$ to a terminal T1 by performing a switching operation if position error $P_{error}$ is smaller than $K_{following}$. Accordingly, position error value $P_{error}$ from first error generator 42 is applied to a Proportional Integration Differential (PID) unit 43. PID unit 43 generates a PID control signal U1, and PID control signal U1 is applied to a voltage/current transducer 48. At this time, control signals U2 and U3, which will be described later, have a value "0" respectively since there is no input through a terminal T2. PID control signal U1 is expressed as the following formula:

$$U1 = K_p * PES_n + K_d (PES_{n-1} - PES_n) + I_{pes}, \text{ when } P_{error} < K_{following}$$

where, $K_p$ and $K_d$ are a proportional gain constant and a derivative gain constant respectively; $PES_n$ is a track position error value indicative of an off-track error from the center of track n; $PES_{n-1}$ is a track position error value one sampling prior $PES_n$; $I_{pes}$ is a track position error integration value of $PES_n$ which occurs at every sampling. Track position error integration value $I_{pes}$ has a small value so that it has little or no influence on the track seeking operation, but has a dominant influence on the track following operation for reducing an error. Voltage/current transducer 48 outputs a digital current $I_d$ to a digital/analog (D/A) converter 50, also denoted by "ACT", in proportion with inputted control signal U1. Digital current $I_d$ is converted to an analog current $I_a$ through digital/analog converter 50. Analog current $I_a$ is applied to actuator 44.

In general, PID control signal U1 performs a control of the track following operation to enable actuator 44 to follow a target track when actuator 44 reaches the target track.

In the meantime, first error generator 42 generates position error value $P_{error}$ to terminal T2 by performing a switching operation when position error value $P_{error}$ is larger than the constant, $K_{following}$. Position error value $P_{error}$ from first error generator 42 is inputted to a velocity profile unit 54. Velocity profile unit 54 stores tabulated target velocity values, each value denoted by "$V_{prof}$" and determined by matching with position error value $P_{error}$. Therefore, when position error value $P_{error}$ from first error generator 42 is applied to velocity profile unit 54, velocity profile unit 54 generates a target velocity value $V_{prof}$ corresponding to position error value $P_{error}$.

Target velocity value $V_{prof}$ from velocity profile unit 54 is supplied to a first subtraction unit 56.

In the meantime, present position value $P_n$ from actuator 44 is also inputted to an arithmetic velocity calculation unit 58 which calculates and outputs an arithmetic velocity value $V_{cal}$ of actuator 44 by the following formula:

$$V_{cal} = (P_n - P_{n-1})/t_{sampling}$$

wherein $P_{n-1}$ is a position error value one sampling prior to $P_n$ and $t_{sampling}$ is a sampling time. Arithmetic velocity value $V_{cal}$ from arithmetic velocity calculation unit 58 is applied to actual velocity calculation unit 60 which calculates an actual velocity value $V_{actual}$ of actuator 44. Actual velocity calculation unit 60 calculates a predictive velocity value $V_{pred}$ prior to a calculation of actual velocity value $V_{actual}$. Predictive velocity value $V_{pred}$ is considered when actual velocity value $V_{actual}$ is calculated since there is a displacement of actuator 44 during a calculation of arithmetic velocity value $V_{cal}$. Predictive velocity value $V_{pred}$ is determined by the following formula:

$$V_{pred} = V_{cal} + K_{pred} * V_{cal}$$

wherein $K_{pred}$ is a constant obtained from trial-and-error and stored in a memory.

When predictive velocity value $V_{pred}$ is obtained through the above formula, actual velocity calculation unit 60 calculates and outputs actual velocity value $V_{actual}$ by the following formula:

$$V_{actual} = (V_{cal} + V_{pred})/2$$

Actual velocity value $V_{actual}$ from actual velocity calculation unit 60 is inputted to first subtraction unit 56. First subtraction unit 56 obtains a velocity error $V_{error}$ which is a difference between target velocity value $V_{prof}$ from velocity profile unit 54 and actual velocity value $V_{actual}$ from actual velocity calculation unit 60, that is, $$V_{error} = V_{prof} - V_{actual}.$$

In order to determine whether an acceleration control is performed or a deceleration control is preformed for actuator 44, first subtraction unit 56 divides actual velocity value $V_{actual}$ by constant, $K_{switching}$, and compares the division result with velocity error value $V_{error}$, wherein the constant, $K_{switching}$, is a constant obtained with experimentation and stored in the memory.

When the division result is smaller than velocity error value $V_{error}$, that is, $(V_{actual}/K_{switching}) < V_{error}$, first subtraction unit 56 performs a switching operation to output velocity error value $V_{error}$ to terminal T3. At this time, fuzzy controller 40 controls actuator 44 in order for actuator 44 to approach a target track rapidly through an acceleration. Accordingly, velocity error value $V_{error}$ from first subtraction unit 56 is inputted to a first adder 62. As shown in FIG. 4, position error integration value $I_{pes}$ is applied to first adder 62. Therefore, first adder 62 outputs an acceleration control signal U2 for actuator 44, as following:

$$U2 = V_{error} + I_{pes}, \text{ when } (V_{actual}/K_{switching}) < V_{error}.$$

In the meantime, when the division result is larger than velocity error value $V_{error}$, that is, $(V_{actual}/K_{switching}) > V_{error}$, first subtraction unit 56 performs a switching operation to output velocity error value $V_{error}$ to terminal T4. At this time, fuzzy controller 40 controls actuator 44 in order for actuator 44 to approach a target track through a deceleration without occurring overshoot at the target track. As shown in FIG. 4, together with velocity error value $V_{error}$, position error integration value $I_{pes}$, actual velocity value $V_{actual}$ and a constant $K_{decel}$ are inputted to a deceleration signal output unit 64.

Figure 5:
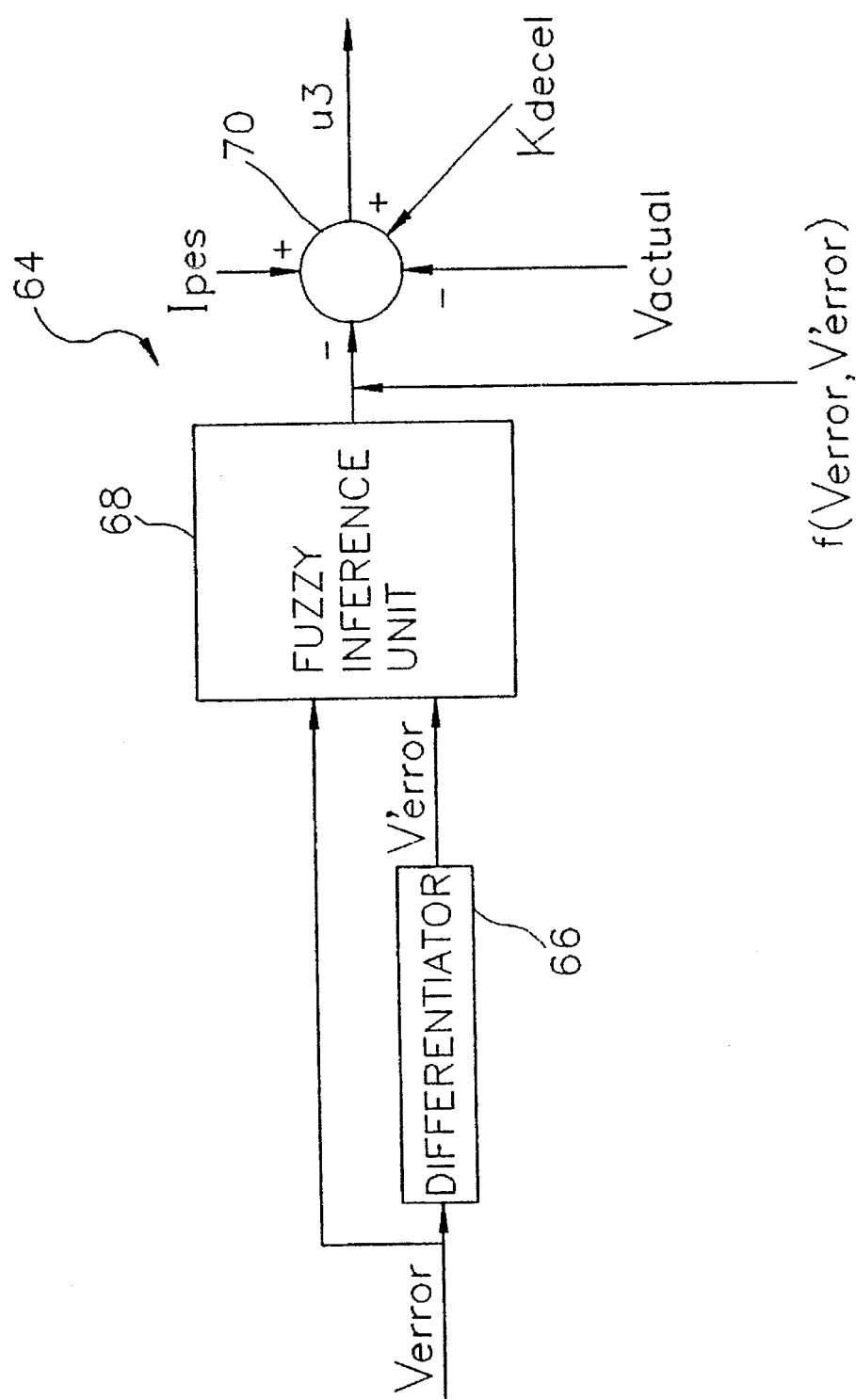
FIG. 5 is a block diagram for illustrating a construction of a deceleration signal output unit employed in the fuzzy controller of FIG. 4.

FIG. 5 is a block diagram for illustrating a construction of a deceleration signal output unit employed in the fuzzy controller of FIG. 4. As shown in FIG. 5, deceleration signal output unit 64 includes a differentiator 66 which outputs a derivative velocity error value $V'_{error}$ obtained by differentiating velocity error value $V_{error}$. Derivative velocity error value $V'_{error}$ and velocity error value $V_{error}$ are applied to a fuzzy inference unit 68. An effective deceleration control is hardly made with velocity error value $V_{error}$ alone since velocity error value $V_{error}$ becomes smaller and smaller while actuator 44 is approaching closer to a target track. Therefore, derivative velocity error value $V'_{error}$ is considered. Fuzzy inference unit 68 outputs a fuzzy inference value, $f(V_{error}, V'_{error})$, in accordance with fuzzy rules when velocity error value $V_{error}$ and derivative velocity error value $V'_{error}$ are inputted.

FIG. 6 is a fuzzy rule table in a fuzzy inference unit of FIG. 4 for generating a fuzzy inference value, $f(V_{error}, V'_{error})$, according to inputs of velocity error value $V_{error}$ and derivative velocity error value $V'_{error}$. Where, PB means positive big, PM positive medium, PS positive small, Z zero, NS negative small, NM negative medium, NB negative big, these language variables constitute 49 fuzzy rules, as shown in FIG. 6. The fuzzy rules are constructed through phenomena that have occurred in conventional control method and experimental trial-and-error. Fuzzy inference value, $f(V_{error}, V'_{error})$, is inputted to a second adder 70, as shown in FIG. 5, together with position error integration value $I_{pes}$, a constant, $K_{decel}$, and actual velocity value $V_{actual}$. Deceleration control signal U3 generated from second adder 70 is expressed as follows:

$$U3 = -f(V_{error}, V'_{error}) - V_{actual} + K_{decel} + I_{pes}, \text{ when } (V_{actual}/K_{switching}) > V_{error}$$

wherein $K_{decel}$ is a predetermined track settling time correction constant stored in the memory for making a track settling time of the actuator constant at any track to which the actuator moves.

Track settling time correction constant, $K_{decel}$, may be corrected as follows according to conditions between transient response time $E_{permit}$ predetermined at every moving track number and actual response time $t_{trans}$. That is, $$K_{decel} = K_{decel} + 1, \text{ when } t_{trans} > E_{permit}, \text{ or}$$

$$K_{decel} = K_{decel} - 1, \text{ when } t_{trans} < E_{permit}.$$

Track settling time correction constant $K_{decel}$ is generated from a track settling time correction constant generator 72 with inputs of present position value $P_n$ and reference value $P_{ref}$. With track settling time correction constant, $K_{decel}$, a constant response is obtained by one tabulated velocity profile in velocity profile unit 54, eliminating using various velocity profiles for coping with various transient response times occurring according to change of the number of tracks to be moved by the actuator 44.

A commutation of actuator 44 from an acceleration to a deceleration or vice versa is performed by comparing $V_{actual}/K_{switching}$ with velocity error value $V_{error}$ at every sampling. In case there are a number of tracks to be travelled by actuator 44, actuator 44 approaches target velocity value $V_{prof}$ very rapidly by an acceleration during a rather long time period. Therefore, a velocity of actuator 44 exceeds target velocity value $V_{prof}$ by acceleration unless the commutation to a deceleration is performed earlier than in case that actuator 44 travels a smaller number of tracks. In the embodiment of the present invention, the commutation reference, $V_{actual}/K_{switching}$ compared with $V_{error}$, is varied in proportion with a velocity of actuator 44 since $V_{actual}/K_{switching}$ is compared with velocity error value $V_{error}$. Therefore, the commutation reference can be applied without considering the number of tracks to be travelled by actuator 44.

Figure 7A:
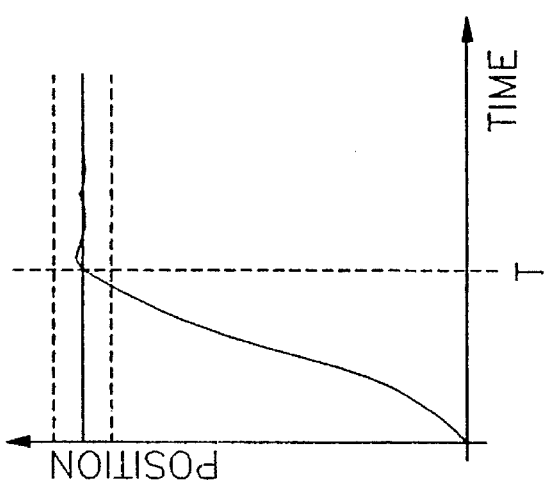
FIGS. 7A to 7C are graphs for showing response curves of actuators in various feedback systems.
Figure 7B:
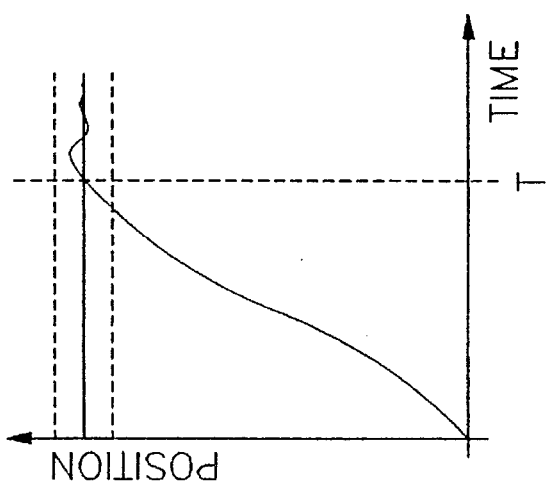
Figure 7C:
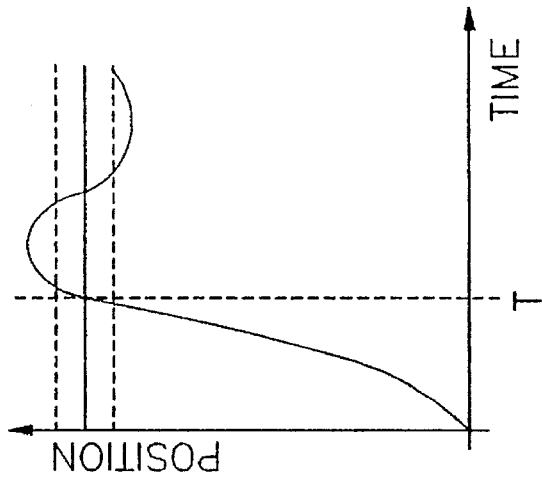

FIGS. 7A to 7C are graphs for showing response curves of actuators, actually position loci of actuators, in various feedback systems. FIGS. 7A and 7B are graphs for showing response curves of actuators in conventional feedback systems, and FIG. 7C is a graph for showing response curve of actuator in an embodiment of the present invention. As shown in FIG. 7A, when a rising time T to a target track becomes short, large overshooting at the target track occurs. As shown in FIG. 7B, when reducing overshooting at the target track, the rising time T becomes larger. A response curve according to an embodiment of the present invention is shown in FIG. 7C. As shown in FIG. 7C, a rising time, T remains small while reducing overshooting at a target track with acceleration and deceleration controls of an actuator in the present fuzzy controller.

Figure 8:
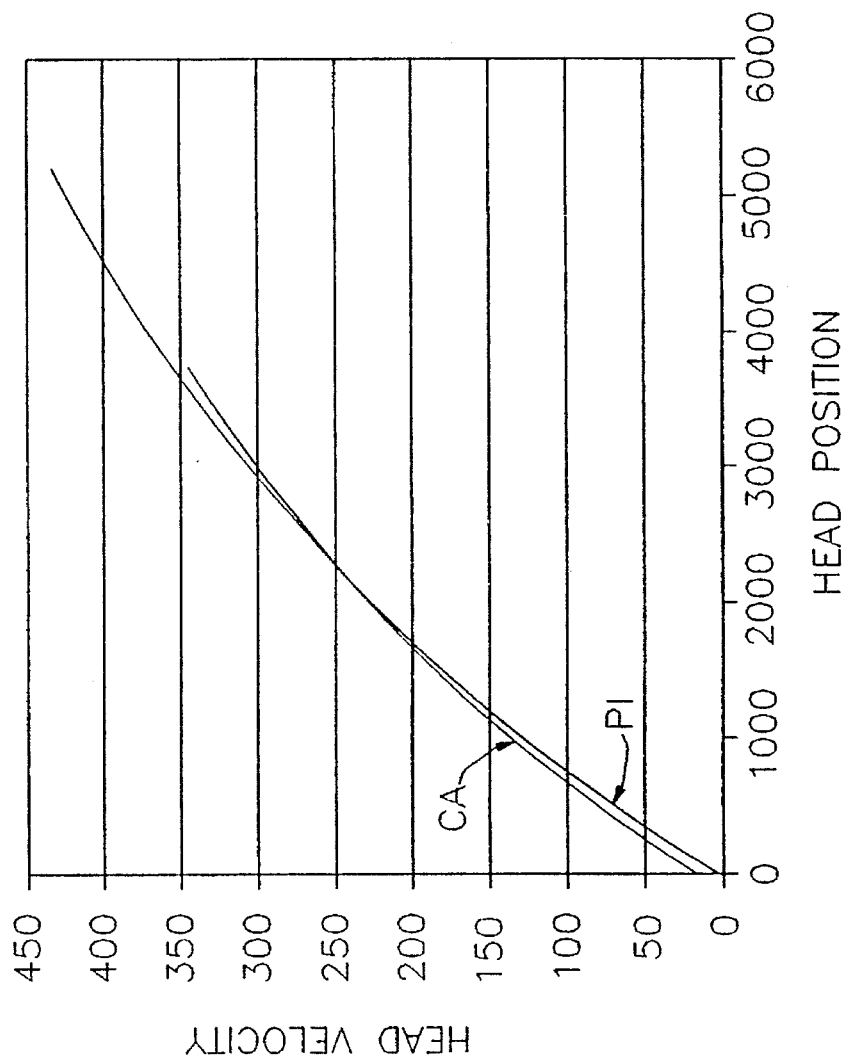
FIG. 8 is a graph for explaining the effect of the fuzzy controller of FIG. 4.

FIG. 8 is a graph for explaining the effect of the fuzzy controller of FIG. 4. Reference numeral CA is indicative of a curve drawn by an actuator under control of a conventional controller, and reference numeral PI is indicative of a curve drawn by an actuator under control of the fuzzy controller of FIG. 4. As shown in FIG. 8, the actuator under control of a fuzzy controller of FIG. 4 approaches a target track along curve PI more effectively and precisely than the actuator under control of the conventional controller along curve CA does.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A fuzzy controller for an actuator, comprising:

a first error generation unit for outputting a position error value with inputs of a present position value of said actuator and a reference value from an external input unit for controlling said actuator;

a first switching unit for switching a track following operation to a track seeking operation or vice versa to control said actuator according to a result of a comparison of said position error value and a first predetermined value;

a first control signal generation unit for generating a track following operation control signal for said track following operation of said actuator based on said position error value inputted according to a switching operation of said first switching unit;

a velocity error generation unit for generating a velocity error value by calculating a difference between a target velocity value and an actual velocity value, wherein said target velocity value is determined based on said position error value inputted according to said switching operation of said first switching unit and said actual velocity value is calculated through an arithmetic operation;

a second switching unit for switching an acceleration control to a deceleration control or vice versa for said actuator by comparing said velocity error value with a result of an arithmetic operation between a second predetermined value and said actual velocity value;

a second control signal generation unit for generating an acceleration control signal for accelerating said actuator by adding said velocity error value inputted according to a switching operation of said second switching unit and a track position error integration value obtained from an integration of track position error values, wherein said track position error values are indicative of values occurring when said actuator is off-track from the center of a track and said integration of track position error values occurs at every sampling; and a third control signal generation unit for generating a deceleration control signal for decelerating said actuator by performing an arithmetic operation between a fuzzy inference value generated according to fuzzy rules based on said velocity error value inputted according to a switching operation of said second switching unit and a differential velocity error value, said track position error integration value, a third predetermined value and said actual velocity value.

2. The fuzzy controller as claimed in claim 1, wherein said velocity error generation unit includes a velocity profile unit for outputting said target velocity value obtained from a velocity profile with an input of said position error value, wherein said velocity profile being a tabulated table having a number of target velocity values corresponding to a number of position error values;

a velocity calculation unit for outputting said actual velocity value through a first arithmetic operation with an input of said present position error value; and a first subtraction unit for outputting said velocity error value corresponding to a difference between said target velocity value and said actual velocity value.

3. The fuzzy controller as claimed in claim 2, wherein said velocity calculation unit includes an arithmetic velocity calculation unit for outputting an arithmetic velocity value through a second arithmetic operation by using said present position value and a position value occurring one sampling prior to said present position value; and an actual velocity calculation for outputting said actual velocity value through a third arithmetic operation with an input of said arithmetic velocity value, wherein said third arithmetic operation averages said arithmetic velocity value and a predictive velocity value obtained by a displacement of said actuator during an arithmetic operation for said arithmetic velocity value.

4. The fuzzy controller as claimed in claim 1, wherein said first control signal generation unit is a proportional integration differential unit.

5. The fuzzy controller as claimed in claim 1, wherein said third predetermined value is a correction constant for correcting a settling time constant at any track to which said actuator moves.

6. A method for controlling an actuator, comprising the steps of:

generating a position error value with inputs of a present position value of said actuator and a reference value for controlling said actuator;

switching a track following operation to a track seeking operation or vice versa to control said actuator according to a result of a comparison of said position error value and a first predetermined value;

generating a track following operation control signal for said track following operation of said actuator based on said position error value inputted according to a switching operation of said operation switching step;

generating a velocity error value by calculating a difference between a target velocity value and an actual velocity value, wherein said target velocity value is determined based on said position error value inputted according to said switching operation of said operation switching step and said actual velocity value is calculated through an arithmetic operation;

switching an acceleration control to a deceleration control or vice versa for said actuator by comparing said velocity error value with a result of an arithmetic operation between a second predetermined value and said actual velocity value;

generating an acceleration control signal for accelerating said actuator by adding said velocity error value inputted according to a switching operation of said control switching step and a track position error integration value obtained from an integration of track position error values, wherein said track position error values are indicative of values occurring when said actuator is off-track from the center of a track and said integration of track position error values occurs at every sampling; and generating a deceleration control signal for decelerating said actuator by performing an arithmetic operation between a fuzzy inference value generated according to fuzzy rules based on said velocity error value inputted according to a switching operation of said control switching step and a differentiated velocity error value, said track position error integration value, a third predetermined value and said actual velocity value.

7. The method as claimed in claim 6, wherein said velocity error generation step includes the steps of:

generating said target velocity value obtained from a velocity profile with an input of said position error value, wherein said velocity profile is a tabulated table having a number of target velocity values corresponding to a number of position error values;

generating said actual velocity value through a first arithmetic operation with an input of said present position error value; and generating said velocity error value corresponding to a difference between said target velocity value and said actual velocity value.

8. A method as claimed in claim 1, wherein said actual velocity generation step includes the steps of:

generating an arithmetic velocity value through a second arithmetic operation by using said present position value and a position value occurring one sampling prior to said present position value; and generating said actual velocity value through a third arithmetic operation with an input of said arithmetic velocity value, wherein said third arithmetic operation averages said arithmetic velocity value and a predictive velocity value obtained by a displacement of said actuator during an arithmetic operation for said arithmetic velocity value.

9. The method as claimed in claim 6, wherein said track following operation control signal is a proportional integration differential (PID) control signal.

10. The method as claimed in claim 6, wherein said third predetermined value is a correction constant for correcting a settling time constant at any track to which said actuator moves.

* * * * *